(12) United States Patent
Tanaka et al.

(10) Patent No.: US 6,203,133 B1
(45) Date of Patent: *Mar. 20, 2001

(54) APPARATUS AND METHOD FOR ENHANCING IMAGE RESOLUTION USING MULTI-LEVEL DATA GENERATED BY HALFTONE PROCESSOR

(75) Inventors: Hideki Tanaka, Yokohama; Shinji Takagi, Kawasaki; Hiroyuki Hyotani, Tokyo, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/685,509

(22) Filed: Jul. 24, 1996

(30) Foreign Application Priority Data

Jul. 28, 1995 (JP) .................................................. 7-193809

(51) Int. Cl.⁷ ...................................................... B41J 2/21
(52) U.S. Cl. .............................. 347/15; 358/456; 358/459
(58) Field of Search .................................. 347/15, 12, 9, 347/5, 183, 184; 358/298, 456, 459

(56) References Cited

U.S. PATENT DOCUMENTS

| 4,313,124 | 1/1982 | Hara .................................. 346/140 R |
| 4,345,262 | 8/1982 | Shirato et al. ................... 346/140 R |
| 4,459,600 | 7/1984 | Sato et al. ........................ 346/140 R |
| 4,463,359 | 7/1984 | Ayata et al. ............................ 346/1.1 |
| 4,558,333 | 12/1985 | Sugitani et al. ................. 346/140 R |
| 4,608,577 | 8/1986 | Hori ................................. 346/140 R |
| 4,723,129 | 2/1988 | Endo et al. ............................ 346/1.1 |
| 4,740,796 | 4/1988 | Endo et al. ............................ 346/1.1 |
| 4,953,227 | 8/1990 | Katsuma et al. ....................... 382/18 |
| 5,099,259 | * 3/1992 | Hirahara et al. ..................... 347/183 |
| 5,387,987 | * 2/1995 | Ino ...................................... 358/456 |
| 5,480,240 | * 1/1996 | Bolash et al. ............................. 347/5 |
| 5,516,216 | * 5/1996 | McDonough et al. ................... 347/5 |
| 5,521,674 | * 5/1996 | Guillory et al. ....................... 347/16 |
| 5,535,307 | * 7/1996 | Glass ....................................... 347/5 |
| 5,559,930 | * 9/1996 | Cariffe et al. ............................ 347/5 |
| 5,650,858 | * 7/1997 | Lund ....................................... 347/5 |

FOREIGN PATENT DOCUMENTS

| 54-56847 | 5/1979 | (JP) . |
| 59-123670 | 7/1984 | (JP) . |
| 59-138461 | 8/1984 | (JP) . |
| 60-71260 | 4/1985 | (JP) . |

* cited by examiner

Primary Examiner—John Barlow
Assistant Examiner—Michael S Brooke
(74) Attorney, Agent, or Firm—Fitzpatrick, Cella, Harper & Scinto (57) ABSTRACT

A recording apparatus records at a higher resolution than the resolution of input image data. A half toning processor performs a halftoning process at each pixel of the input image to get multi level data from the input image data. A data producer produces pattern data corresponding to the pixel of the input image based on the multi level data. Data for a plurality of different patterns is produced for at least one value of the multi level data.

55 Claims, 6 Drawing Sheets

APPARATUS AND METHOD FOR ENHANCING IMAGE RESOLUTION USING MULTI-LEVEL DATA GENERATED BY HALFTONE PROCESSOR

BACKGROUND OF THE INVENTION

1. Field of the Invention

This invention relates to image processing wherein image data produced by a host computer is quantized to multi value data prior to using it in an output apparatus such as a display apparatus or a printer. More specifically, the invention relates to novel methods and apparatus for image processing wherein image data is produced at a higher resolution than that of the original image data from the host computer.

2. Description of the Related Art

Recent developments in image processing have permitted printers and display apparatus to form images at very high resolutions; which in some cases, are higher than that used in a host computers.

Figure 1:
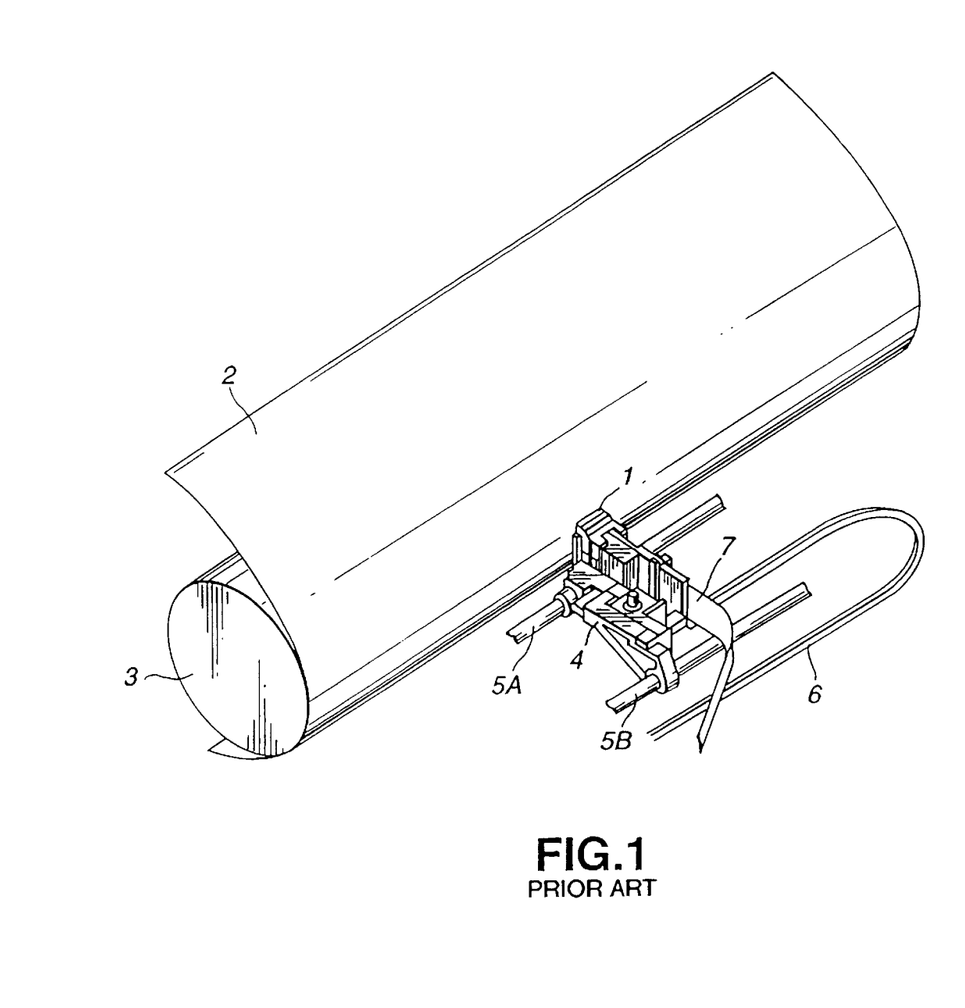
FIG. 1 is a perspective view of the principal portion of a known ink jet printer.

By way of background, reference may be made to FIG. 1 of the accompanying drawings. This figure shows a print head 1 and associated parts of a known ink jet printer. Print heads in such printers typically have resolutions in the range of 600 dpi (dots per inch).

The print head 1, which has a resolution of 600 dpi, is provided with 128 ink discharge openings which are spaced apart from each other by 42.3 microns. These discharge openings are arranged so that they eject ink onto a recording paper 2 as the print head 1 scans across the recording paper 2 in a sub-scanning direction. Between successive scans of the print head 1 in the sub-scanning direction, the paper 2 is driven in a forward direction by a roll 3.

Each of the 128 discharge openings in the print head 1 has associated ink path through which liquid ink passes from a supply (not shown). Individual heaters are provided along each of these ink paths within the print head 1. These heaters generate thermal energy in response to electrical pulses received from a driver controller. The thermal energy causes film boiling of the liquid ink in the associated ink path; and this in turn causes a bubble to be generated which forces a droplet of ink out of the respective print head discharge opening and onto the recording paper 2. The pulses from the driver controller are coordinated with the scanning movement of the print head 1 so that the droplets of ink will be discharged at desired locations on the recording paper. The frequency of heater driving signals, that is, the discharge frequency of ink droplets from the print head, is 10 KHz.

The size of the print head discharge openings is set such that the ink droplets will appear at a predetermined density upon landing on the recording paper 2. This density, known as "Optical Density" (O.D.), has a value of b 1.4when one ink droplet lands on a 42.3 micron square pixel.

A carriage 4 on which the print head 1 is mounted is supported by a pair of guide shafts 5A and 5B which extend in the direction of sub-scan, that is, across the recording paper 2; thereby to allow the print head 1 to scan over the recording paper in the sub-scan direction. The carriage 4 is connected to a belt which extends over pulleys (not shown) near the ends of the guide shafts 5. The pulleys, which are driven by a motor, cause the belt to move and pull the carriage 4 and the print head 1 along in the sub-scan direction.

A flexible ink tube 6 connects the print head 1 to a stationary ink supply tank (not shown) so that liquid ink from the tank can be supplied continuously to the print head as it moves along in its scanning direction.

A flexible cable 7 connects the moveable print head 1 to a stationary head driver circuit (not shown). Electrical pulses from the head driver circuit are supplied via the cable 7 to the print head 1 as it scans in the sub-scan direction. These electrical pulses are applied to the heaters in the print head at a timing based on information from the print head driver; and they cause the heaters to generate thermal energy to eject ink droplets as described above. The timing of the electrical pulses is controlled by the print head driver so that the ink droplets land at predetermined locations on the recording paper 2.

The longitudinal axis of the platen roller 3 extends parallel to the guide shafts 5A and 5B; and as it turns about its axis, the platen roller drives the recording paper 2 in a direction perpendicular to the sub-scanning direction. The platen roller 3 also provides a solid back support for the recording paper 2 in the region thereof where the ink droplets ejected from the print head 1 land. As will be appreciated, the movement of the print head in the sub-scan direction and the movement of the recording paper 2 in the perpendicular direction, provide coordinates which define precisely where ink droplets from the print head 1 will land on the recording paper 2. By proper control of these coordinates and by synchronizing them with the pulses which are supplied to the print head heaters, ink drops can be directed at appropriate locations on the recording paper 2 to form a desired image.

Figure 2:
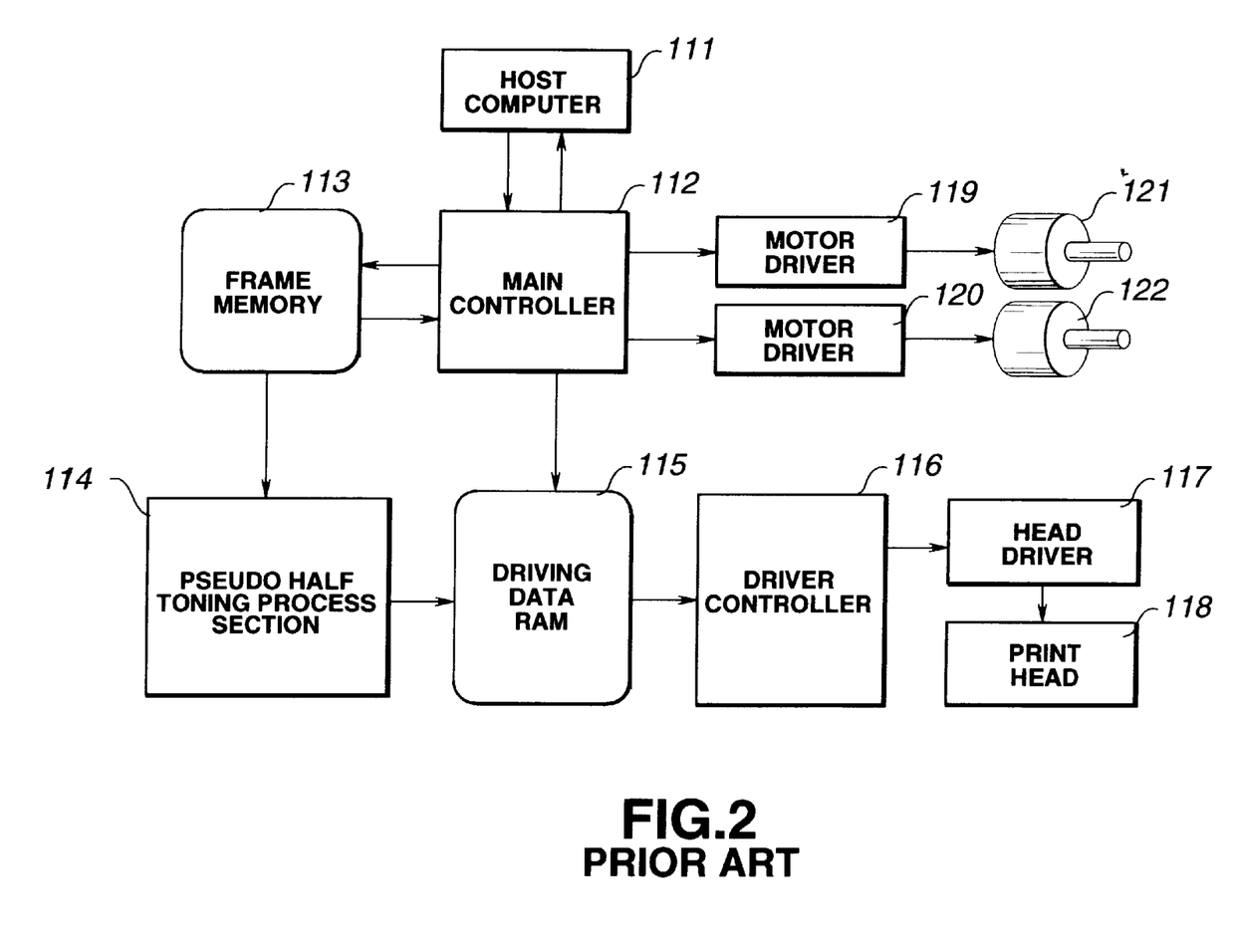
FIG. 2 is a block diagram of a known printer control arrangement for controlling the operation of the printer of FIG. 1.

FIG. 2 is a block diagram showing a known control structure for the ink jet apparatus as shown in FIG. 1. As shown in FIG. 2, a main controller 112, which includes a central processing unit (CPU), receives image data from a host computer 111 and supplies the data to a frame memory 113 where it is stored. The image data is arranged according to pixels which correspond to specific locations on the recording sheet 2 (FIG. 1). The image data for each pixel comprises 8 binary bits, which provides the pixel with a possibility of 256 tones. The main controller 112 causes this pixel tone data to be transferred from the frame memory 113 to a pseudo half toning process section 114, and from there to a driving RAM (random access memory) 115. The pseudo half toning process section 114 converts the 8-bit tone data of each pixel into 1-bit data. This pseudo half toning processing may be carried out according to any of several well known algorithms, some of which are known as the "dither method", the "error diffusion method", etc.

A driver controller 116, in response to a control signal from the main controller 112, reads out driving data which is stored in a driving data RAM 115. This data, which corresponds to each discharge opening of the print head 1, is supplied to a head driver 117 and controls its driving timing.

In the above described structure, the main controller 112 operates through the driver controller 116 and the head driver 117 to control ink discharge from the print head 1 (118 in FIG. 2). The main controller 112 also operates through a carriage motor driver 119 to control movement of a carriage drive motor 121; and it operates through a paper feed motor driver 120 to control movement of a paper feed motor 122. As a result, characters and graphic images corresponding to input image data are printed on the recording paper 2 and paper feed motor driver 120 and paper feed motor 122, together constituting a transporter, transport the recording paper 2.

The print head in the ink jet printer of FIG. 1 has a resolution of 600 dpi; which makes it possible to print at a relatively high resolution. However, if the image data from the host computer 111 has a resolution of only about 300 to 400 dpi and is processed with the system of FIG. 2, the high print resolution capability of the printer cannot be realized.

When a print head which has a resolution of 600 dpi prints from 300 dpi image data using the system of FIG. 2, each data bit will correspond to four dots which occupy a 2×2 matrix. As a result, the printed image is reduced from a possible five tones to only two tones. On the other hand if, by means of resolution conversion, 600 dpi image data is supplied to the print head, it is possible to obtain a high tone output from the printer. However, the time required to transfer data from the host computer 111 to the main controller 112 in such case is about 4 times that which would be required for 300 dpi resolution printing. As the conversion magnification increases, the required data transfer time also increases; and therefore this technique is not practical for high resolution print heads.

Though the above explanation concerns an image processor in a print system using a print head, it will be appreciated that this same situation will occur in the case of a display system which forms a visible image on a liquid crystal device or on a cathode ray tube (CRT).

SUMMARY OF THE INVENTION

One object of the present invention is to provide an image process method and an output apparatus which can print or display an image at high tone using high output resolution in an output apparatus such as a display apparatus and a print apparatus.

It is another object of the invention to provide an image process method and an output apparatus which can lengthen the life of output device in the output apparatus.

According to one aspect of the present invention, there is provided a novel output apparatus which outputs an image at a higher resolution than the resolution of input image data. This output apparatus comprises a halftone processor, a data producer and an output device. The halftone processor performs a halftoning process at each pixel of the input image to obtain multi level data (i.e., data having more levels (possible values) than binary data) from the input image data. The data producer produces pattern data corresponding to the pixel of the input image based on the multi level data so that the pattern data to be produced in at least one value of the multi level data are different from each other. The output device outputs an image based on the pattern data supplied from the data producer.

According to another aspect of the present invention, there is provided a novel image processor for processing image at a higher resolution than the resolution of input image data. This novel processor comprises a halftoning processor and a data producer. The halftoning processor performs a halftoning process at each pixel of the input image to obtain multi level data from the input image data; and the data producer produces pattern data which corresponds to the pixel of the input image based on the multi level data so that the pattern data to be produced in at least one value of the multi level data are different from each other.

According to a further aspect of the present invention, there is provided a novel method for processing an image at a higher resolution than the resolution of input image data. This novel method comprises the steps of performing a halftoning process at each pixel of the input image to obtain multi level data from the input image data; and producing plural pattern data corresponding to the pixel of the input image based on the multi level data so that the plural patterns to be produced in at least one value of the multi level data are different from each other.

According to a still further aspect of this invention, there is provided novel apparatus for driving a high resolution image producing device to produce a high resolution image from low resolution input image signals. The high resolution image producing device has a group of image forming elements which correspond to a single pixel of the low resolution input image signals; and these image forming elements, when activated, form an image element on an image presentation medium. The low resolution input image signals have halftoning density components which define an image halftoning density for each pixel. This novel apparatus comprises an image level signal producing means which produces image level signals of different levels based on the halftoning density components of each pixel of the input image signals; pattern forming means for forming, within the group, a plurality of patterns of image forming elements, each pattern comprising a number of image forming elements corresponding to an associated image level signal; and an image forming element activating means which activates the image forming elements of different patterns upon subsequent occurrences of image level signals of the same level.

According to yet another aspect of this invention, there is provided a novel method for driving a high resolution image producing device to produce a high resolution image from low resolution input image signals. The high resolution image producing device has a group of image forming elements which correspond to a single pixel of the low resolution input image signals; and which, when activated, form an image element on an image presentation medium. The low resolution input image signals have halftoning density components which define an image halftoning density for each pixel. This novel method comprises the steps of producing image level signals of different levels based on the halftoning density components of each pixel of the input image signals; forming, within the group, signals defining a plurality of patterns of image forming elements, each pattern comprising a number of image forming elements corresponding to an associated image level signal; and activating the image forming elements of different patterns upon subsequent occurrences of image level signals of the same level.

DETAILED DESCRIPTION OF THE PREFERRED EMBODIMENTS

Figure 3:
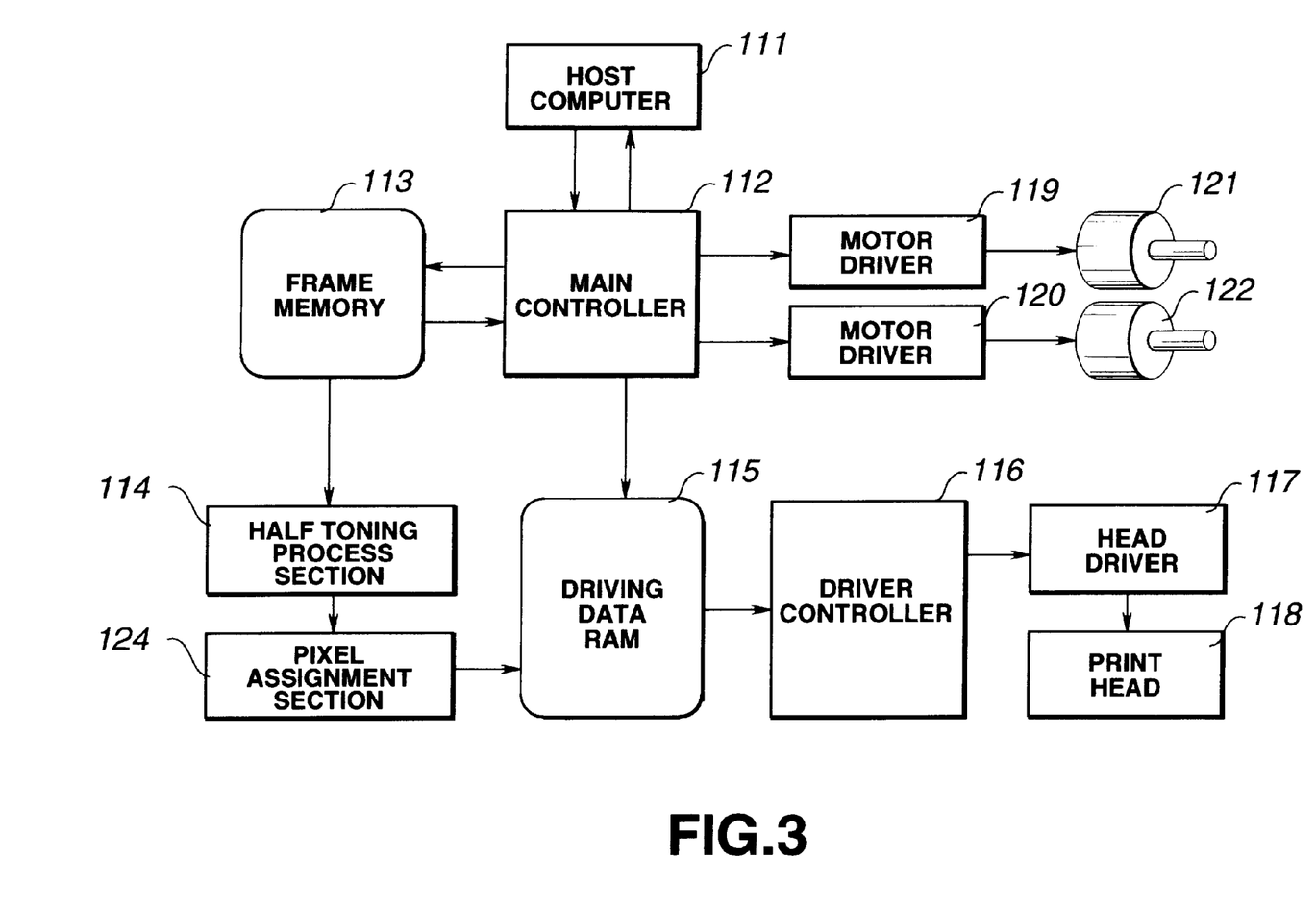
FIG. 3 is a block diagram of a printer control arrangement comprising one embodiment of the present invention.
Figure 4:
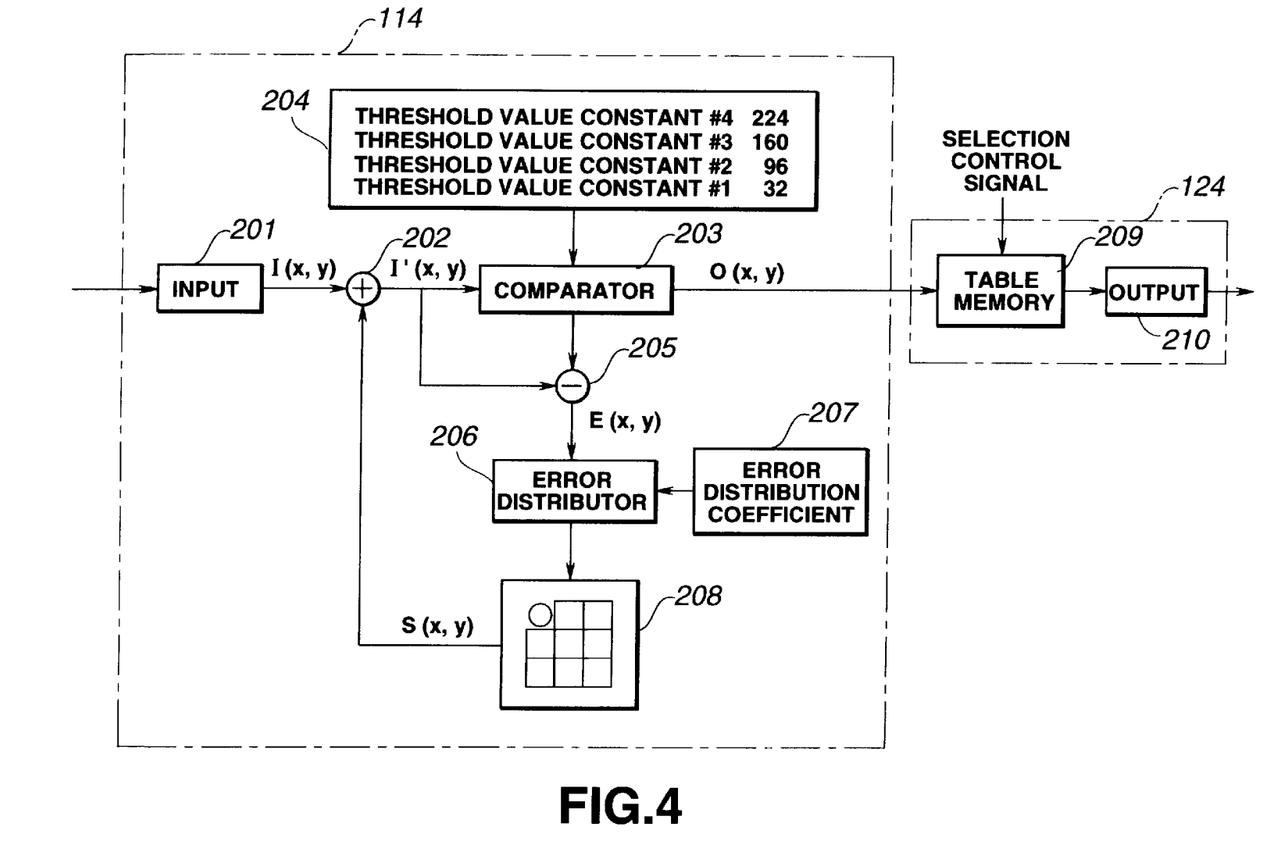
FIG. 4 is a detailed block diagram of a halftoning process section and a pixel assignment section of the printer control arrangement of FIG. 3.

To the extent that the printer control arrangement of FIGS. 3–5E is similar to that of FIG. 2, the same reference numerals are used for the same parts. As shown in FIG. 3, a pixel assignment section 124 is provided between the halftoning process section 114 and the driving data RAM 115. The halftoning processing section 114, as shown in FIG. 4, comprises an input section 201, an adder 202, a comparator 203, a threshold value constant memory 204, a subtractor 205, an error distributor 206, an error distribution coefficient memory 207 and an error diffusion matrix memory 208. Pixel data at a resolution of 300 dpi is applied from the frame memory 113 (FIG. 3) to the input section 201. This data comprises 8 bits per pixel and represents a possibility of 256 levels per pixel. This pixel data is processed in the halftoning process section 114 and the pixel assignment section 124. It is then stored in the driving data RAM 115.

In order to drive a print head having a resolution of 600 dpi, the halftoning section 114 converts the 8 bit (256 level) pixel data into data having five values per pixel. The converted data is then transferred to the pixel assignment section 124; and from there it is transferred to the driving data RAM 115 according to a protocol to be described.

In the halftoning section 114 as shown in FIG. 4, the 8 bit pixel data of 300 dpi resolution is represented as "I(x,y)" for each pixel. "I" corresponds to the 8 bit halftoning density of the pixel data and "x" and "y" represent the coordinates of the location on the recording paper or other recording medium to which the pixel is assigned.

The input data I(x,y) is added to an error data S(x,y) in the adder 202 to obtain a corrected input data I'(x y). This corrected data is then transferred to the comparator 203 where it is compared with four threshold values or constants #1, #2, #3 and #4, which are stored in the threshold value constant memory 204. From this, the comparator 203 produces corresponding output pixel data O(x,y). In the described embodiment, threshold constant #1 is equal to 32, constant #2 is equal to 96, constant #3 is equal to 160 and constant #4 is equal to 224.

If the corrected input data I'(x,y) is equal to or less than threshold constant #1 (i.e. 32), the comparator 203 produces a "0" output. If I'(x,y) is greater than 32 and equal to or less than 96 (threshold constant #2), the comparator produces a "1" output. If I'(x,y) is greater than 96 and equal to or less than 160 (threshold constant #3), the comparator produces a "2" output. If I'(x,y) is greater than 160 and equal to or less than 224 (threshold constant #4), the comparator produces a "3" output; and if I'(x,y) is greater than 224, the comparator produces a "4" output. These outputs take the place of "O" in the above representation of the comparator output. Accordingly, the "O" in the comparator output will be either "0", "1", "2", "3" or "4", depending on the value of the corrected input data I'(x,y). This comparator output is supplied to a table memory 209 in the pixel assignment section 124.

The comparator 203 also supplies signals to a subtractor 205. The value of the signals supplied to the subtractor is "0" where the comparator output is "0", "64" where the comparator output is "1", "128" where the comparator output is "2", "192" where the comparator output is "3" and "255" where the comparator output is "4". This number ("0", "64", "128", "192" or "255") is subtracted from the original corrected input value I'(x,y) to produce difference or error signals E(x,y). These error signals are applied to the error distributor 206 which distributes them within a particular region of their associated pixel locations (x,y). This distribution is carried out according to an error diffusion matrix which is determined by a coefficient in the coefficient memory 207. The error data E(x,y) is then stored in the memory 208 according to the error diffusion matrix. That is, the error data is distributed to successive pixel locations in the same line and to corresponding pixel locations in successive lines.

In other words, the error signal E(x,y) is stored, according to the error diffusion matrix, in the memory 208 which in turn accumulates the errors distributed around the specified pixel. On the other hand, the output data S(x,y) of the distributed error accumulation memory 208 is added to the data I(x,y) of the specified pixel to be processed, by the adder 202. The above described process is performed on each 300 dpi pixel so as to provide a halftoning density value of "0" to "4" for each pixel.

The output data O(x,y), which for each pixel has a halftoning density value of "0" to "4", is applied to a table memory 209 in the pixel assignment section 124. Here one of sixteen possible pixel dot distribution arrangements, described hereinafter in connection with FIGS. 5A–5E, is selected; and a corresponding signal is output from an output unit 210 of the pixel assignment section 124. This signal is then stored in the driving data RAM 115 as data corresponding to a 600 dpi print head.

Referring now to FIGS. 5A to 5E, these drawings show, conceptually, the contents of the table memory 209 in the pixel assignment section 124 of FIG. 4. They also show how 300 dpi data, which has been converted to five values as described above, is assigned to each pixel of a 600 dpi arrangement (W1=1/300";W2=1/600").

Figure 5A:
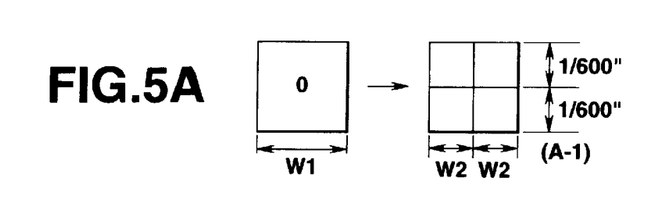
FIGS. 5A, 5B, 5C, 5D, and 5E are diagrammatic representations showing pixel assignments used in the printer control arrangement of FIGS. 3 and 4.
Figure 5B:
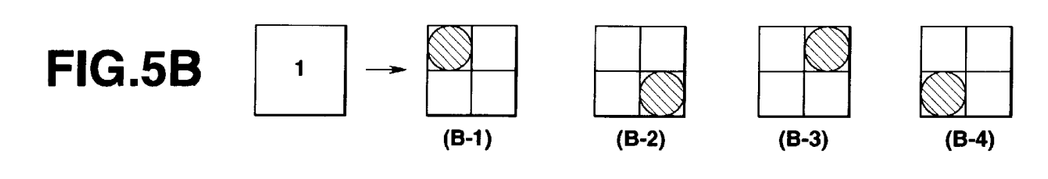
Figures 5C, 5D:
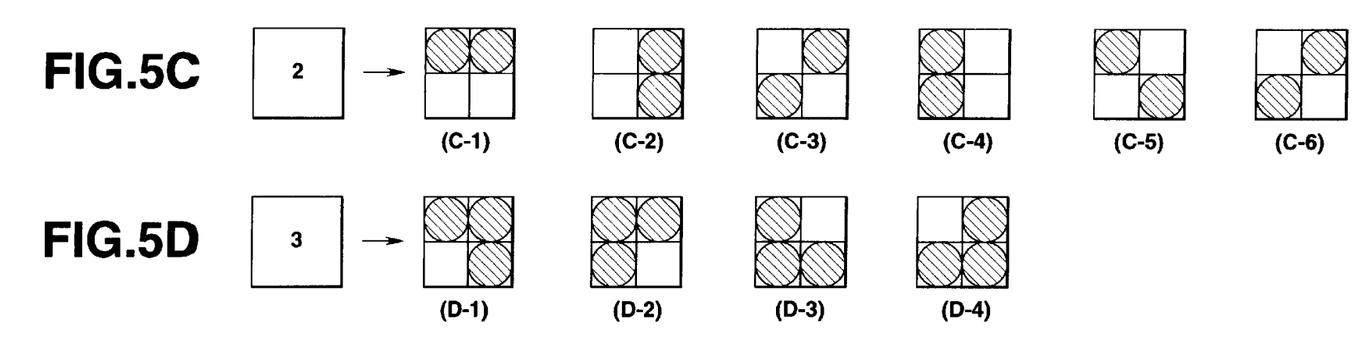
Figure 5E:
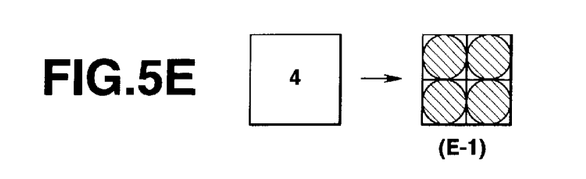

FIGS. 5A to 5E show cases where the output value data represented by "O" in O(x,y) is 0, 1, 2, 3, and 4 respectively. Thus, FIG. 5A shows the case where the output value data represented by "O" is 0; FIG. 5B shows the case where the output value data represented by "O" is 1; FIG. 5C shows the case where the output value data represented by "O" is 2; FIG. 5D shows the case where the output value data represented by "O" is 3; and FIG. 5E shows the case where the output value data represented by "O" is 4. As can be seen in FIGS. 5A to 5E each 300 dpi pixel has a size which corresponds to four 600 dpi pixels.

In FIG. 5A the output data value is 0, which means that no ink is to be ejected; and therefore there is only one possibility, namely, that no ink ejection driving signal is to be applied to any of the four 600 dpi pixel areas associated with one 300 dpi pixel. FIG. 5B represents the case where one 600 dpi ink ejection driving signal is to be applied to a 300 dpi pixel area. In this case there are four possibilities, namely (B-1), (B-2), (B-3) and (B-4); that is, the ink ejection could take place in any of the four 600 dpi pixels which correspond to the 300 dpi pixel area. FIG. 5C represents the case where two 600 dpi ink ejection driving signals are to be applied to a 300 dpi pixel area. As can be seen, there are six different possibilities for this case, namely (C-1), (C-2), (C-3), (C-4), (C-5) and (C-6). In FIG. 5D, which represents the case where three 600 dpi ink ejection driving signals are to be applied to a 300 dpi pixel area. In this case there are four possibilities, namely (D-1), (D-2), (D-3) and (D-4). Lastly, in FIG. 5E, which represents the case where four 600 dpi ink ejection driving signals are to be applied to a 300 dpi pixel area, these four 600 dpi pixels correspond to the entire 300 dpi area; and this leaves only one possibility, namely (E-1).

As can be seen from the foregoing, where the data value O(x,y) is 0 or 4, there is only one possibility; and an ink driving signal is generated or not, depending on whether the value represented by "O" is 4 or 0. On the other hand, since there are several different possibilities where the value represented by "O" is "1", "2" or "3", it becomes necessary to select one of these possibilities. As will be explained, this is done using table input data.

Considering now the case where the data level O(x,y) is such that "O" equals "1", this produces the situation of FIG. 5B where one 600 dpi dot can be applied to any of four possible locations within the corresponding 300 dpi area. These possibilities are shown at (B-1), (B-2), (B-3) and (B-4), respectively. One of these possibilities is selected to be output from the table memory 209 in the pixel assignment section 124 (FIG. 4). Initially, when a pixel data level signal O(x,y) is such the "O" equals "1", the case of (B-1) is selected. That is, a 600 dpi ink drop is directed through the upper left ink discharge opening of the pixel area over which a 300 dpi pixel extends.

Now, the next time that a pixel data signal O(x,y) occurs in which "O" equals "1", the possibility of (B-2) will be selected. That is, a 600 dpi ink drop will be directed through the lower right ink discharge opening of the pixel area over which a 300 dpi pixel extends. Successive occurrences of pixel data signals O(x,y) in which "O" equals "1", cause sequential selection of the FIG. 5B possibilities, namely (B-3), (B-4), (B-1), (B-2), etc., in that order.

The sequential selection of the FIG. 5B possibilities is achieved by means of a counter whose output is applied to the table memory 209 shown in FIG. 4.

In cases where the pixel data signal O(x,y) is such that "O" equals "2", the six possibilities of FIG. 5C are selected in sequence; and in cases where the pixel data signal O(x,y) is such that "O" equals "3", the four possibilities of FIG. 5D are selected in sequence.

As described above in the present embodiment, in the case that the value represented by the output data O(x,y) corresponds to plural table data (e.g. (B-1) . . . (B-4); (C-1) . . . (C-6) or (D-1) . . . (D-4)), the table data is selected sequentially. That is, the first time the comparator output is "1", the pattern (B-1) is selected; the second time the comparator output is "1", the pattern (B-2) is selected; the third time the comparator output is "1", the pattern (B-3) is selected and the fourth time the comparator output is "1", the pattern (B-4) is selected. Similar sequences of pattern selection occur for the patterns (C-1) . . . (C-6) when the comparator output is "2" and for the patterns (D-1) . . . (D-4) when the comparator output is "3". According to this embodiment, even though the tone level obtained by the halftoning process is the same as in the image of 300 dpi, dot arrangement of each pixel formed by the print head which has a resolution of 600 dpi based on the image data can be differed sequentially. For this reason, since the dot arrangement forming a pixel of each tone level is not fixed in the printed image, pseudo outline caused by the pseudo half toning process and undesirable phenomenon presented in edge portion of the image can be reduced. This phenomenon means clustered dots that fundamentally should not appear on an image but appear remarkably near the edge portion of the image.

It will be appreciated that because the discharge openings of a 600 dpi printer are selected sequentially according to the present invention, these discharge openings are each used nearly equally. Consequently, the useful life of the printer can be maximized.

The above described embodiment can be modified to increase or decrease the table data used in carrying out the process, depending on the particular hardware being used. For example, while in the above described embodiment, the output data O(x,y) obtained by the halftoning process is categorized into five different values ("0", "1", "2", "3" and "4"), a lesser number of values can be used. Where the printer is an ink jet printer, four values ("0" to "3") may be used with minimal difference in resulting print quality. In such case, the pattern data (D-1) . . . (D-4) is not used; and the table input data O(x,y) is reduced from 3 to 2 bits. Consequently the capacity of the table memory can be reduced.

It is also possible to reduce the quantity of table data which corresponds to the output data O(x,y). For example, in the case that the output data O(x,y) is "1", only two table data for two patterns, namely (B-1) and (B-3) need be provided. This significantly reduces the amount of memory that needs to be provided; and yet the beneficial effect of this invention can still be realized.

Figure 6:
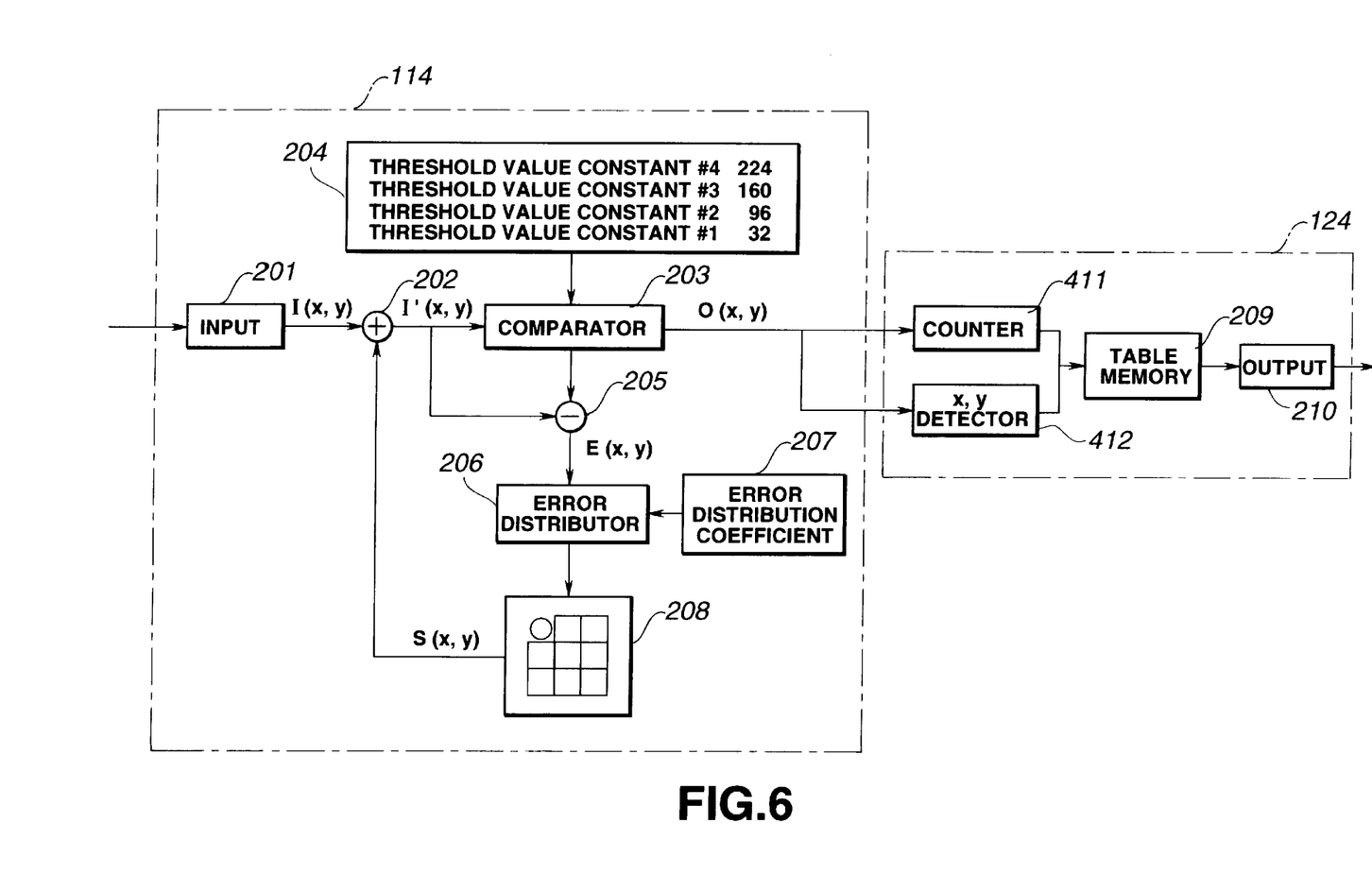
FIG. 6 is a block diagram similar to FIG. 4 but showing an alternative pixel assignment section.

A second embodiment of this invention is shown in FIG. 6. In FIG. 6 the same reference numerals are used for elements which are the same as in the preceding embodiment.

FIG. 6 is a block diagram showing details of the halftoning process section and the pixel assignment section related to the second embodiment of this invention. As shown in FIG. 6, several counters 411 are provided which correspond to values "1" to "3" of value "0" to "4" presented by the output data O(x,y) of the halftoning process. When the value of the output data O(x,y) is "1", "2" or "3", plural table data (shown in FIGS. 5B, 5C and 5D) correspond to the output data, so one counter is provided for each value, that is, a total of three counters 411 are provided in the embodiment. In addition, an element which outputs constantly fixed values in accordance to the other values of the output data O(x,y), that is the values, "0" or "4", is provided in the counters 411.

A detector 412 is connected to receive the data O(x,y) and to detect in this data the position (x,y) of each pixel to be processed. In this embodiment, one of the three counters 411 is selected along with the x,y detector 412. The table data for the selected function is selected based on data for each pixel obtained by the selected function. When one of the counters 411 is selected, this embodiment performs the same as the first embodiment.

Various kinds of data, for instance characters, line drawings, natural graphics, computer graphics, may be supplied from the host computer 111. Since it is necessary for some kinds of output apparatus, such as the ink jet printers used in this embodiment, to faithfully reproduce data input from a host computer, it is necessary to change the input data according to the form of the input image. The embodiment of FIG. 6 is to be structured to change the print data according to the input image.

In the arrangement of FIG. 6, when the input image is natural graphics, the counters 411 are used as the means to select the table memory. In this case the print data is set not to be the pattern by which pixels of the output image are fixed.

On the other hand, when the input image is a character or computer graphics, the x, y detector 412 is selected as the means for selecting the table memory, so that one of the data in the table memory is selected based on the value of x and y. When the table data is selected corresponding to the value of x and y in this way, the selected table data is output in the regular way. Therefore the print data is regularly output; and intended print result can be obtained in the case of data of a character and computer graphics.

As explained above according to this embodiment, by changing the selection method of the table data for an image, it is possible to obtain faithful reproduction of that data from a host computer. Moreover, though counters and an x,y detector (pixel position detector) are used in this embodiment, provided that a proper scale of hardware is used, various methods can be adopted corresponding to an image.

The levels of the halftoning process can be changed, or table data quantity can be reduced, in this embodiment in the same manner as mentioned above in regard to the first embodiment, to achieve a similar effect.

While the "halftoning process" of the present invention has been described above with reference to the pseudo halftoning process of error diffusion, the present invention is not limited to use of an error diffusion method. It will be appreciated that the invention may be applied with use of other halftoning processes, including, e.g., a dither method.

While an ink jet printer has been described as an example of an output apparatus in the above described embodiments, the present invention is not limited to apparatus using ink jet printers. It will be appreciated that this invention can be applied to apparatus which use other types of printers, such as a thermal printer, an LED printer and an impact printer; and it can also be applied to apparatus which uses a display means such as a liquid crystal device.

Moreover, the method of selection of the pixel pattern is not limited to above described embodiments; and the present invention can be applied to a random selection of the pixel pattern.

In the present invention, the data for an output element, such as a pixel, is obtained by changing the pattern of such output element corresponding to each of the various multi levels (i.e., values) produced by the halftoning process. The present invention can prevent the pixel pattern forming printed image from becoming fixed or constant; and it can diffuse a fixed pattern.

As a result, according to the invention, it is possible to output an image at a high tone and high quality while making good use of the resolution capabilities of an output apparatus.

Typical structures and operational principles of devices to which the present invention can be applied, are described in U.S. Pat. Nos. 4,723,129 and 4,740,796. Those structures and principles include both the so-called on-demand type recording system and the continuous type recording system; but they are particularly suitable to the on-demand type. Such an approach adopts the principle that at least one driving signal is applied to an electrothermal transducer disposed on a liquid (ink) retaining sheet or in a liquid passage, the driving signal being sufficient to provide a quick temperature rise beyond a departure-from-nucleation boiling point. The thermal energy provided by the electrothermal transducer produces film boiling on the heating portion of the recording head, whereby a bubble can be formed in the liquid(ink) in response to each driving signal. The production, development and contraction of the bubble causes ejection of the liquid (ink) through an ejection outlet to produce at least one droplet. The driving signal is preferably in the form of a pulse, because this enables the instantaneous development and contraction of the bubble. Therefore, the liquid (ink) is ejected in quick response to the driving signal.

The manner of providing a pulse-shaped driving signal for driving the printer is disclosed in U.S. Pat. No. 4,463,359 and U.S. Pat. No. 4,345,262. In addition, the manner of increasing the rate temperature rise of the heating surface is preferably such as disclosed in U.S. Pat. No. 4,313,124.

The structure of the print head may be as shown in U.S. Pat. No. 4,558,333 and U.S. Pat. No. 4,459,600, which describe the heating element as being disposed at a bent portion of the ink path. These patents also describe preferred structures for the ejection outlet, the liquid passage and the electrothermal transducer in the print head. In addition, the present invention is applicable to the structures disclosed in Japanese Laid-Open Patent Application No. 59-123670, wherein a common slit is used as the ejection outlet for plural electrothermal transducers. It is also applicable to the structures disclosed in Japanese Laid-Open Application No 59-138461, wherein an opening for absorbing thermal energy pressure waves is formed at each corresponding ejecting portion. This is because the present invention is effective to perform recording with certainty and at high efficiency regardless of the type of recording head used.

In addition, the present invention is applicable to use with a serial type recording head wherein the recording head is fixed on the main assembly; and it is applicable for use with a replaceable chip type recording head which is connected electrically with the main apparatus and which can be supplied with the ink when it is mounted in the main assembly. In addition, the invention is applicable for use with a cartridge type recording head having an integral ink container.

It is preferred to provide recovery and/or auxiliary means for the printer start-up operations. Such means can further stabilize the effects of the present invention. Examples of such means include a capping means for the ink ejection outlets in the print head, pressurizing or suction means for keeping the ink ejection outlets or orifices clean, and preliminary heating means (which may be an electrothermal transducer, an additional heating element or a combination thereof). Also, means for effecting preliminary ejection (to precede the actual recording operation) can stabilize the recording operation.

The recording head may be a single head which records using a single color ink, or it may be plural heads corresponding to plural ink materials having different recording colors or densities. The present invention is effectively applied to an apparatus having at least one of a monochromatic mode (using, most commonly, black ink), a multi-color mode using different color ink materials, and/or a full-color mode using a mixture of colors, which may be an integrally formed recording unit or a combination of plural recording heads.

The ink jet recording apparatus may be used as an output terminal of an information processing apparatus such as a computer or the like, as a copying apparatus when combined with an image reader or the like, or as a facsimile machine having information sending and receiving functions.

The entire disclosures of U.S. Pat. Nos. 4,740,796; 4,723,129; 4,558,333; 4,463,359; 4,459,600 and 4,345,262, are incorporated herein by reference; and reference is also made to Japanese Laid-Open Patent Application Nos. 54-56847, 59-123670, 59-138461, and 60-71260, which disclose material not essential to a complete disclosure of this invention.

While the invention has been described with reference to the preferred structures disclosed herein, it is not confined to the details set forth above. To the contrary, many modifications and variations thereof will be readily apparent to those skilled in the art, and this application is intended to cover all such modifications or changes as may come within the purposes of the disclosed improvements disclosed above, within the scope of the following claims.

We claim:

1. An output apparatus for outputting an image at a higher resolution than the resolution of input image data arranged as pixels, said output apparatus comprising:
   a halftoning processor configured to perform a halftoning process at each pixel of the input image data to obtain multi level data from the input image data;
   a data producer configured to receive the multi level data obtained by said halftoning processor and to produce pattern data corresponding to each pixel of the input image data based on the multi level data obtained by said halftoning processor, wherein for at least one value of the multi level data, said data producer produces pattern data selected from a plurality of pattern data different from one another with respect to arrangement of pixels thereof without requiring selection of the same pattern data for every pixel of the input image data having the same value of the multi level data; and
   an output device for outputting an image based on the pattern data supplied from said data producer.

2. Apparatus according to claim 1, wherein said data producer produces different pattern data for different patterns for at least one halftone level.

3. Apparatus according to claim 1, wherein said data producer produces different pattern data for different patterns in a predetermined order.

4. Apparatus according to claim 3, wherein said data producer produces different pattern data for said different patterns in a sequential order.

5. Apparatus according to claim 1, wherein said data producer produces different pattern data for different patterns in a random order.

6. Apparatus according to claim 1, wherein said data producer produces different pattern data for different patterns based on a position represented by the pattern data to be output.

7. Apparatus according to claim 1, wherein said data producer produces different pattern data by changing plural patterns according to a form of an input image.

8. Apparatus according to claim 1, wherein said data producer produces pattern data representing a dot arrangement for said pixel of the input image data.

9. Apparatus according to claim 1, wherein said data producer produces pattern data by extraction of said pattern data from a table memory in which signals representing plural patterns are stored.

10. Apparatus according to claim 1, wherein said output device comprises a print head.

11. Apparatus according to claim 10, wherein said data producer produces pattern data corresponding to pixels from which an image is printed by said print head.

12. Apparatus according to claim 10, wherein said print head effects recording by discharging a recording liquid.

13. Apparatus according to claim 12, wherein said print head discharges the recording liquid by using thermal energy.

14. Apparatus according to claim 1, wherein said output device comprises a plurality of print heads, each of said print heads being capable of printing in a different color.

15. Apparatus according to claim 10, further comprising a transporter for transporting a recording medium onto which the image formed by the print head is printed.

16. Apparatus according to claim 1, wherein said output device comprises an image display.

17. Apparatus according to claim 1, wherein said output apparatus is a terminal for a computer.

18. Apparatus according to claim 1, wherein an image scanner of a copying machine is arranged to provide the input image data to said apparatus, and wherein said output device is the printer of the copying machine.

19. Apparatus according to claim 1, further comprising an image scanner connected to provide said input image data and a data transmitting and receiving unit for transmitting input image data to a remote location and for receiving image input data from a remote location such that said output apparatus functions as a facsimile machine.

20. An image processor for processing image data at a higher resolution than the resolution of input image data arranged as pixels, said processor comprising:
   a halftoning processor configured to perform a halftoning process at each pixel of the input image data to obtain multi level data for the pixels based on the input image data; and
   a data producer configured to receive the multi level data from said halftoning processor and to produce pattern data corresponding to each pixel of the input image data based on the multi level data obtained by said halftoning processor, wherein for at least one value of the multi level data, the pattern data for one pixel based on the one value of the multi level data is not required to be the same, with respect to arrangement of pixels thereof, as the pattern data for another pixel based on the one value of the multi level data.

21. An image processor according to claim 20, wherein said data producer produces different pattern data for different patterns for at least one halftone level.

22. An image processor according to claim 20, wherein said data producer produces different pattern data for different patterns in a predetermined order.

23. An image processor according to claim 22, wherein said data producer produces different pattern data for different patterns in a sequential order.

24. An image processor according to claim 20, wherein said data producer produces different pattern data for different patterns in a random order.

25. An image processor according to claim 20, wherein said data producer produces different pattern data for different patterns based on a position represented by the pattern data to be output.

26. An image processor according to claim 20, wherein said data producer produces different pattern data by changing plural patterns according to a form of an input image.

27. An image processor according to claim 20, wherein said data producer produces pattern data representing a dot arrangement for said pixel of the input image data.

28. An image processor according to claim 20, wherein said data producer produces pattern data by extraction of said pattern data from a table memory in which signals representing plural patterns are stored.

29. A method for processing an image at a higher resolution than the resolution of input image data arranged as pixels, said method comprising the steps of:
   performing a halftoning process at each pixel of the input image data to obtain multi level data from the input image data; and
   producing, for each pixel of the input image data, a pattern data corresponding to the pixel, the pattern data being based on the multi level data obtained in said step of performing a halftoning process, wherein for at least one value of the multi level data, the pattern data for one pixel based on the one value of the multi level data is not required to be the same, with respect to arrangement of pixels thereof, as the pattern data for another pixel based on the one value of the multi level data.

30. A method according to claim 29, wherein the pattern data produced for each pixel is different for at least one halftone level of the multi level data.

31. A method according to claim 29, wherein data for one of a plurality of patterns are produced for at least one value of the multi level data and wherein the producing step produces data for different patterns based on said one value in a predetermined order.

32. A method according to claim 31, wherein the step of producing produces data for different patterns in a sequential order.

33. A method according to claim 29, wherein the step of producing produces data for different patterns in a random order.

34. A method according to claim 29, wherein the step of producing produces data for different patterns based on a position of the pattern data to be output.

35. A method according to claim 29, wherein the step of producing produces data for different patterns based on a form of the input image.

36. A method according to claim 29, wherein the step of producing produces pattern data which represents a dot arrangement for each pixel of the input image data.

37. A method according to claim 29, wherein the step of producing produces pattern data by extraction of same from a table memory in which signals representing plural patterns are stored.

38. Apparatus for driving a high resolution image producing device to produce a high resolution image from low resolution input image signals, said high resolution image producing device having a group of image forming elements which correspond to a single pixel of the low resolution input image signals and which, when activated form an image element on an image presentation medium, said low resolution input image signals having halftoning density components which define an image halftoning density for each pixel, said apparatus comprising:
   means for producing image level signals of different levels based on the halftoning density components of each pixel of said input image signals;
   means for forming, within said group, a plurality of patterns of image forming elements, each pattern comprising a number of image forming elements corresponding to an associated image level signal, and
   means for activating the image forming elements of different patterns upon subsequent occurrences of image level signals of a same level.

39. A method for driving a high resolution image producing device to produce a high resolution image from low resolution input image signals, said high resolution image producing device having a group of image forming elements which correspond to a single pixel of the low resolution input image signals, which, when activated form an image element on an image presentation medium, said low resolution input image signals having halftoning density components which define an image halftoning density for each pixel, said method comprising the steps of:
   producing image level signals of different levels based on the halftoning density components of each pixel of said input image signals;
   forming, within said group, a plurality of patterns of image forming elements, each pattern comprising a number of image forming elements corresponding to an associated image level signal, and
   activating the image forming elements of different patterns upon subsequent occurrences of image level signals of a same level.

40. An apparatus comprising:
   halftoning means for performing halftoning at each pixel of input image data arranged as pixels to obtain multi level data having more levels than binary data; and
   pattern outputting means for outputting, for each pixel of the image input data and in accordance with the multi level data obtained by said halftoning means, pattern data having a plurality of pixels,
   wherein for at least one level of the multi level data, said pattern outputting means outputs pattern data selected from a plurality of pattern data differing from one another with respect to arrangement of pixels without requiring selection of the same pattern data for every pixel of the input image data having the same value of the multi level data.

41. An apparatus according to claim 40, wherein for at least one level of the multi level data, said pattern outputting means outputs pattern data selected at random from a plurality of pattern data differing from one another with respect to arrangement of pixels.

42. An apparatus according to claim 40, wherein for at least one level of the multi level data, each successive time that the level is obtained by said halftoning means, said pattern outputting means outputs a sequentially successive one of a plurality of pattern data differing from one another with respect to arrangement of pixels.

43. An apparatus according to claim 40, wherein said pattern outputting means outputs, for each pixel of the image input data, pattern data having four pixels.

44. An apparatus according to claim 40, wherein the multi level data has five levels.

45. A method for processing an image at a higher resolution than the resolution of input image data arranged as pixels, said method comprising the steps of:
   performing a halftoning process at each pixel of the input image data to obtain multi level data from the input image data; and
   producing, for each pixel of the input image data, a pattern data corresponding to the pixel, the pattern data being based on the multi level data obtained in said step of performing a halftoning process, wherein for at least one value of the multi level data, the pattern data for one pixel based on the one value of the multi level data is not required to be the same as the pattern data for another pixel based on the one value of the multi level data.

46. An output apparatus for outputting an image at a higher resolution than the resolution of input image data arranged as pixels, said output apparatus comprising:
   a halftoning processor configured to perform a halftoning process at each pixel of the input image data to obtain multi level data from the input image data;
   a data producer configured to receive the multi level data obtained by said halftoning processor and to produce pattern data corresponding to each pixel of the input image data based on the multi level data obtained by said halftoning processor, wherein a plurality of pattern data, different from one another with respect to arrangement of pixels thereof, are produced for at least one value of the multi level data and different pattern data are differently selected and produced for multi level data having the same value; and
   an output device for outputting an image based on the pattern data supplied from said data producer,
   wherein said data producer produces different pattern data for different patterns for at least one halftone level.

47. An output apparatus for outputting an image at a higher resolution than the resolution of input image data arranged as pixels, said output apparatus comprising:
   a halftoning processor configured to perform a halftoning process at each pixel of the input image data to obtain multi level data from the input image data;

a data producer configured to receive the multi level data obtained by said halftoning processor and to produce pattern data corresponding to each pixel of the input image data based on the multi level data obtained by said halftoning processor, wherein a plurality of pattern data, different from one another with respect to arrangement of pixels thereof, are produced for at least one value of the multi level data and different pattern data are differently selected and produced for multi level data having the same value; and an output device for outputting an image based on the pattern data supplied from said data producer, wherein said data producer produces different pattern data for different patterns in a random order.

48. An image processor for processing image data at a higher resolution than the resolution of input image data arranged as pixels, said processor comprising:

a halftoning processor configured to perform a halftoning process at each pixel of the input image data to obtain multi level data for the pixels based on the input image data; and a data producer configured to receive the multi level data from said halftoning processor and to produce pattern data corresponding to each pixel of the input image data based on the multi level data obtained by said halftoning processor, wherein for at least one value of the multi level data, the pattern data for one pixel based on the one value of the multi level data is different, with respect to arrangement of pixels thereof, from the pattern data for another pixel based on the one value of the multi level data, wherein said data producer produces different pattern data for different patterns for at least one halftone level.

49. An image processor for processing image data at a higher resolution than the resolution of input image data arranged as pixels, said processor comprising:

a halftoning processor configured to perform a halftoning process at each pixel of the input image data to obtain multi level data for the pixels based on the input image data; and a data producer configured to receive the multi level data from said halftoning processor and to produce pattern data corresponding to each pixel of the input image data based on the multi level data obtained by said halftoning processor, wherein for at least one value of the multi level data, the pattern data for one pixel based on the one value of the multi level data is different, with respect to arrangement of pixels thereof, from the pattern data for another pixel based on the one value of the multi level data, wherein said data producer produces different pattern data for different patterns in a random order.

50. A method for processing an image at a higher resolution than the resolution of input image data arranged as pixels, said method comprising the steps of:

performing a halftoning process at each pixel of the input image data to obtain multi level data from the input image data; and producing, for each pixel of the input image data, a pattern data corresponding to the pixel, the pattern data being based on the multi level data obtained in said step of performing a halftoning process, wherein for at least one value of the multi level data, the pattern data for one pixel based on the one value of the multi level data is different, with respect to arrangement of pixels thereof, from the pattern data for another pixel based on the one value of the multi level data, wherein the pattern data produced for each pixel is different for at least one halftone level of the multi level data.

51. A method for processing an image at a higher resolution than the resolution of input image data arranged as pixels, said method comprising the steps of:

performing a halftoning process at each pixel of the input image data to obtain multi level data from the input image data; and producing, for each pixel of the input image data, a pattern data corresponding to the pixel, the pattern data being based on the multi level data obtained in said step of performing a halftoning process, wherein for at least one value of the multi level data, the pattern data for one pixel based on the one value of the multi level data is different, with respect to arrangement of pixels thereof, from the pattern data for another pixel based on the one value of the multi level data, wherein the step of producing produces data for different patterns in a random order.

52. An apparatus comprising:

halftoning means for performing halftoning at each pixel of input image data arranged as pixels to obtain multi level data having more levels than binary data; and pattern outputting means for outputting, for each pixel of the image input data and in accordance with the multi level data obtained by said halftoning means, pattern data having a plurality of pixels, wherein for at least one level of the multi level data, said pattern outputting means outputs pattern data selected from a plurality of pattern data differing from one another with respect to arrangement of pixels, and wherein for at least one level of the multi level data, said pattern outputting means outputs pattern data selected at random from a plurality of pattern data differing from one another with respect to arrangement of pixels.

53. An apparatus comprising:

halftoning means for performing halftoning at each pixel of input image data arranged as pixels to obtain multi level data having more levels than binary data; and pattern outputting means for outputting, for each pixel of the image input data and in accordance with the multi level data obtained by said halftoning means, pattern data having a plurality of pixels, wherein for at least one level of the multi level data, said pattern outputting means outputs pattern data selected from a plurality of pattern data differing from one another with respect to arrangement of pixels, and wherein the multi level data has five levels.

54. An apparatus comprising:

pattern outputting means for outputting, for each pixel of image data and in accordance with multi level data, pattern data having a plurality of pixels, the multi level data being obtained by performing a halftoning process at each pixel of image data arranged as pixels and having more levels than binary data, wherein for at least one level of the multi level data, said pattern outputting means outputs pattern data selected from a plurality of pattern data differing from one another with respect to arrangement of pixels without requiring selection of the same pattern data for every pixel of the image data having the same value of the multi level data.

55. An image data processor for processing image data at a higher resolution than the resolution of image data arranged as pixels, said processor comprising:

a data producer configured to receive multi level data and to produce pattern data corresponding to each pixel of image data based on the multi level data, wherein the multi level data for the pixels is obtained by performing a halftoning process at each pixel of the image data based on the image data, wherein for at least one value of the multi level data, the pattern data for one pixel based on the one value of the multi level data is not required to be the same, with respect to arrangement of pixels thereof, as the pattern data for another pixel based on the one value of the multi level data.

* * * * *

UNITED STATES PATENT AND TRADEMARK OFFICE
CERTIFICATE OF CORRECTION

PATENT NO.     : 6,203,133 B1
DATED          : March 20, 2001
INVENTOR(S)    : Hideki Tanaka et al.

It is certified that error appears in the above-identified patent and that said Letters Patent is hereby corrected as shown below:

Column 1,
Line 19, "a" be deleted.
Line 34, "path" should read -- paths --.
Line 51, "of b" should read -- of --.

Column 13,
Line 39, "signal, and" should read -- signal; and --.
Line 59, "signal, and" should read -- signal; and --.

Column 18,
Line 6, "data," should read -- data, and --.

Signed and Sealed this

Twenty-fifth Day of June, 2002

Attest:

JAMES E. ROGAN
Attesting Officer          Director of the United States Patent and Trademark Office